(12) United States Patent
Sarkis et al.

(10) Patent No.: US 11,930,480 B2
(45) Date of Patent: Mar. 12, 2024

(54) REDUCED SENSING PROCEDURE FOR SIDELINK COMMUNICATIONS

(71) Applicant: QUALCOMM Incorporated, San Diego, CA (US)

(72) Inventors: Gabi Sarkis, San Diego, CA (US); Tien Viet Nguyen, Bridgewater, NJ (US); Shuanshuan Wu, San Diego, CA (US); Kapil Gulati, Belle Mead, NJ (US); Peter Gaal, San Diego, CA (US); Wanshi Chen, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/353,269

(22) Filed: Jun. 21, 2021

(65) Prior Publication Data

US 2021/0400664 A1    Dec. 23, 2021

Related U.S. Application Data

(60) Provisional application No. 63/042,443, filed on Jun. 22, 2020.

(51) Int. Cl.
*H04W 4/00* (2018.01)
*H04W 72/0446* (2023.01)

(52) U.S. Cl.
CPC .............................. *H04W 72/0446* (2013.01)

(58) Field of Classification Search
CPC . H04W 72/0446; H04W 72/04; H04W 72/20; H04W 8/005
See application file for complete search history.

(56) References Cited

U.S. PATENT DOCUMENTS

| 10,313,851 | B2 * | 6/2019 | Blasco Serrano ......................... H04W 72/0446 |
| 11,109,363 | B2 * | 8/2021 | Huang .................. H04L 1/1822 |
| 2018/0279094 | A1 * | 9/2018 | Blasco Serrano .... H04W 72/04 |
| 2018/0359787 | A1 * | 12/2018 | Lee ........................ H04L 1/1848 |
| 2019/0261414 | A1 * | 8/2019 | Ron ........................ H04W 72/02 |
| 2020/0068531 | A1 * | 2/2020 | Sundberg .......... H04W 52/0216 |

(Continued)

FOREIGN PATENT DOCUMENTS

| EP | 3497996 A1 | 6/2019 |
| EP | 3522630 A1 | 8/2019 |
| WO | 2019066629 A1 | 4/2019 |

OTHER PUBLICATIONS

International Search Report and Written Opinion—PCT/US2021/038423—ISA/EPO—dated Oct. 27, 2021.

*Primary Examiner* — Abdelnabi O Musa
(74) *Attorney, Agent, or Firm* — Seyfarth Shaw, LLP

(57) ABSTRACT

A sidelink user equipment (UE) limits sensing of received sidelink communications during a sensing window. The UE selects resources for a future transmission from a resource pool that is based on the sensed received sidelink communications. The UE also sends the future transmission on the selected resources. Limiting sensing may result from reducing a maximum distance between reservations to less than 32 logical slots. Limiting sensing may be sensing with a reduced sensing duty cycle with discontinuous sensing or sensing for a period of time in response to a trigger. The UE may perform partial sensing for periodic traffic, and limit sensing for aperiodic traffic.

26 Claims, 15 Drawing Sheets

(56) References Cited

U.S. PATENT DOCUMENTS

| | | | |
|---|---|---|---|
| 2020/0068615 A1* | 2/2020 | Ron | H04W 72/0446 |
| 2020/0374861 A1* | 11/2020 | Shilov | H04W 72/20 |
| 2021/0289549 A1* | 9/2021 | Blasco Serrano | H04W 28/0289 |
| 2021/0314750 A1* | 10/2021 | Nguyen | H04W 76/10 |
| 2021/0337519 A1* | 10/2021 | Farag | H04L 5/0053 |
| 2022/0279581 A1* | 9/2022 | Baek | G01S 13/765 |
| 2023/0028098 A1* | 1/2023 | Lin | H04W 72/0446 |
| 2023/0120774 A1* | 4/2023 | Xue | H04W 74/0808 370/336 |
| 2023/0276481 A1* | 8/2023 | Xue | H04L 5/0094 370/329 |
| 2023/0300862 A1* | 9/2023 | Hwang | H04W 16/14 370/329 |

* cited by examiner

| | $P_{step}$ |
|---|---|
| TDD with UL/DL configuration 0 | 60 |
| TDD with UL/DL configuration 1 | 40 |
| TDD with UL/DL configuration 2 | 20 |
| TDD with UL/DL configuration 3 | 30 |
| TDD with UL/DL configuration 4 | 20 |
| TDD with UL/DL configuration 5 | 10 |
| TDD with UL/DL configuration 6 | 50 |
| Otherwise | 100 |

*FIG. 8*

| | Candidates in Selection Window | Monitored subframes in sensing window |
|---|---|---|
| Full sensing | All, then exclude | All |
| Partial sensing | Subset, then exclude | Subset |
| No sensing | All | None |

*FIG. 9*

REDUCED SENSING PROCEDURE FOR SIDELINK COMMUNICATIONS

CROSS-REFERENCE TO RELATED APPLICATION

The present application claims the benefit of U.S. Provisional Patent Application No. 63/042,443, filed on Jun. 22, 2020, and titled "REDUCED SENSING PROCEDURE FOR SIDELINK COMMUNICATIONS," the disclosure of which is expressly incorporated by reference in its entirety.

FIELD OF THE DISCLOSURE

Aspects of the present disclosure generally relate to wireless communications, and more particularly to techniques and apparatuses for a new radio (NR) vehicle-to-everything (V2X) reduced sensing procedure for sidelink communications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink UEs, such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

SUMMARY

In aspects of the present disclosure, a method of wireless communication by a sidelink user equipment (UE) includes limiting sensing of received sidelink communications during a sensing window, by sensing discontinuously. The method also includes selecting resources for a future transmission from a resource pool that is based on the sensed received sidelink communications. The method further includes sending the future transmission on the selected resources.

In other aspects of the present invention, a method of wireless communication by a sidelink user equipment (UE) includes sensing received sidelink communications during a sensing window, in response to a trigger. The method also includes selecting resources for a future transmission from a resource pool that is based on the sensed received sidelink communications. The method further includes sending the future transmission on the selected resources.

Still other aspects of the present disclosure are directed to an apparatus for wireless communications at a user equipment (UE) having a processor, memory coupled with the processor and instructions stored in the memory. When the instructions are executed by the processor, the apparatus limits sensing of received sidelink communications during a sensing window by sensing discontinuously. The apparatus also selects resources for a future transmission from a resource pool that is based on the sensed received sidelink communications. The method further sends the future transmission on the selected resources.

Other aspects of the present disclosure are directed to an apparatus for wireless communications at a user equipment (UE) having a processor, memory coupled with the processor and instructions stored in the memory. When the instructions are executed by the processor, the apparatus senses received sidelink communications during a sensing window, in response to a trigger. The apparatus also selects resources for a future transmission from a resource pool that is based on the sensed received sidelink communications. The apparatus further sends the future transmission on the selected resources.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a table showing a parameter for resource selection for a resource selection window.

FIG. 9 is a table showing a summary of long term evolution (LTE) sensing procedures.

DETAILED DESCRIPTION

Figure 1:
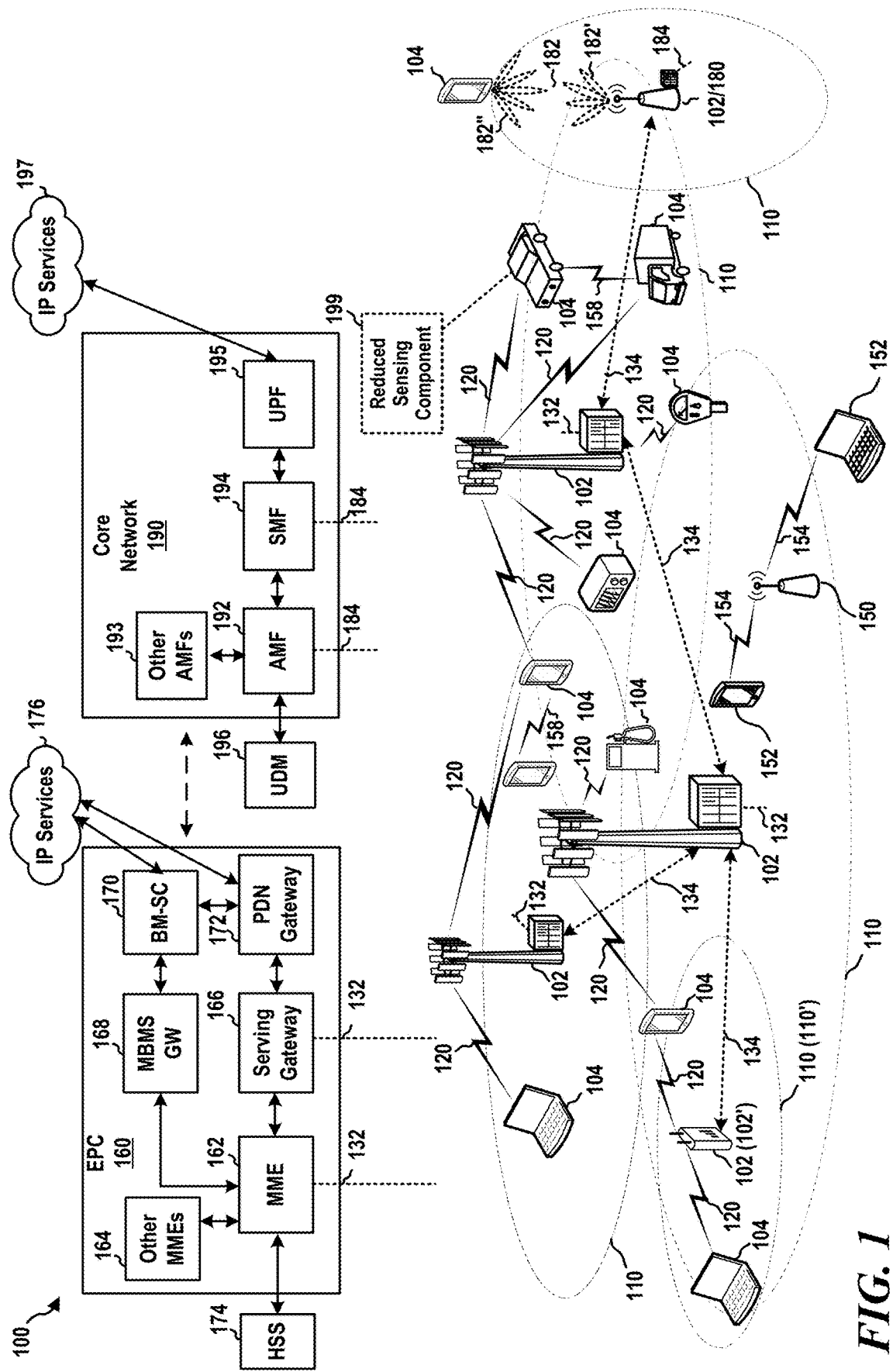
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

To enable communication between devices (e.g., UEs), radio frequency resources are assigned. In some scenarios, autonomous resource selection by a sidelink UE occurs, such as with respect to NR mode 2. Autonomous resource selection by the sidelink UE is based on sensing information obtained during a sensing window. Sensing prior communications enables the UE to predict what resources neighbor sidelink UEs might use, allowing the UE to schedule its own transmissions around resources predicted to be occupied. For example, the UE can detect reservations for future slots and exclude those slots from a resource selection window.

There is a desire to enable limited sensing in NR sidelink communications while reducing an impact on full sensing UEs for both periodic and aperiodic traffic. Such limited sensing will reduce UE power consumption and/or UE implementation complexity.

According to aspects of the present disclosure, a reduced sensing window size is introduced. In some aspects, a smaller sensing window size, T0−Tproc,0, is 50 ms, where T0 represents the beginning of the sensing window and Tproc,0 represents a UE processing time for sensing information. In other aspects, a maximum distance between slot reservations, W', is limited to less than 32 logical slots. With the smaller sensing window size, $T_0$, transmissions may be limited to a subset of slots or resources in the transmission resource pool.

A UE is permitted to reserve resources for three slots, a current slot and up to two future reservations in one sidelink control information transmission. According to aspects of the present disclosure, a maximum distance between slot reservations, W', on the subset of slots may be limited to be less than thirty-two logical slots. That is, UEs can only reserve these slots W' slots in advance. In other aspects, legacy UEs may increase a maximum distance between reservations, for example, W' may be equal to thirty-two logical slots. For legacy UEs, the excluded resources may be marked as reserved within the legacy transmission resource pool.

According to other aspects of the present disclosure, reduced sensing is implemented with a reduced sensing duty cycle. The reduced sensing window may be applied with or without the reduced maximum distance between reservations, W'.

In other aspects, the UE may stop sensing if no selection trigger is received, for example, before expiration of a timer. The timer may reset when the UE performs a transmission or a retransmission. According to further aspects of the present disclosure, on-demand sensing is only performed after a trigger is received. On-demand sensing may be applied with or without the reduced maximum distance between slot reservations, W'. In these aspects, the sensing may be extended for retransmissions.

According to other aspects of the present disclosure, partial sensing is implemented for periodic traffic, whereas reduced sensing is applied for aperiodic traffic. In still other aspects, reduced sensing is applied for both periodic and aperiodic traffic.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5

GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE, such as the UE 104, may limit sensing of received sidelink communications during a sensing window. The UE may select resources for a future transmission from a resource pool that is based on the sensed received sidelink communications. The UE may also send the future transmission on the selected resources. In other aspects, the UE 104 may sense received sidelink communications in response to a trigger, select resources based on the sensing, and send a future transmission on the selected resources. The UE 104 may include a reduced sensing component 199 configured to limit the sensing.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu * 15$ kHz, where µ=5 is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement or negative acknowledgement (ACK/NACK) feedback. The PUSCH carries data, and may additionally be used to carry a buffer status report (BSR), a power headroom report (PHR), and/or UCI.

Figure 3:
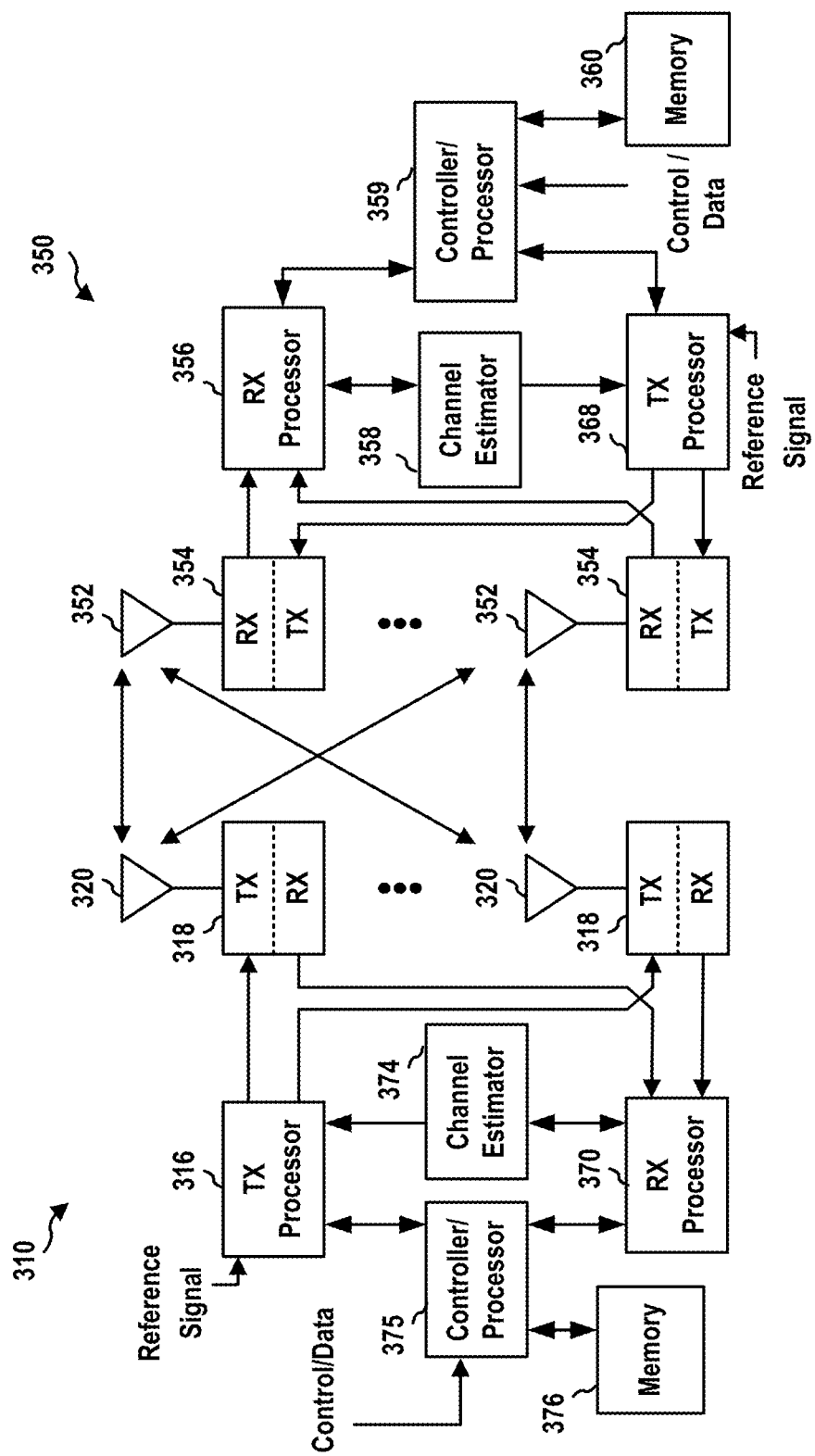
FIG. 3 is a diagram illustrating an example of a base station in communication with a user equipment (UE) in an access network.

FIG. 3 is a diagram illustrating an example a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC)

layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the reduced sensing component 199 of FIG. 1. In some aspects, the UE 104, 350 may include means for limiting, means for selecting, means for sending, means for reserving, means for sensing, and/or means for stopping. Such means may include one or more components of the UE 104, 350 described in connection with FIGS. 1 and 3.

Figure 4:
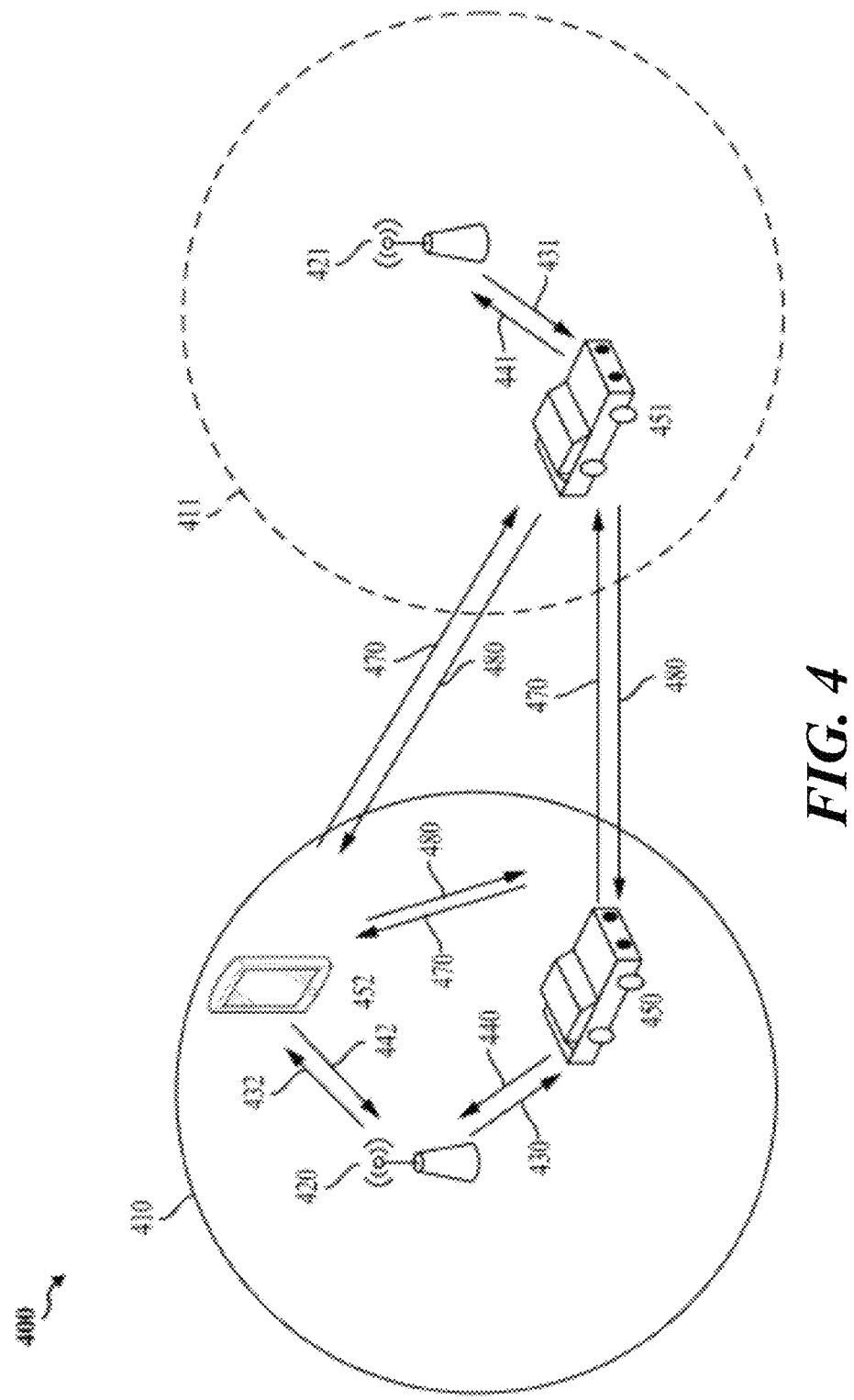
FIG. 4 is a diagram illustrating an example of a device-to-device (D2D) communications system, including vehicle-to-everything (V2X) communications, in accordance with various aspects of the present disclosure.

FIG. 4 is a diagram illustrating an example of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
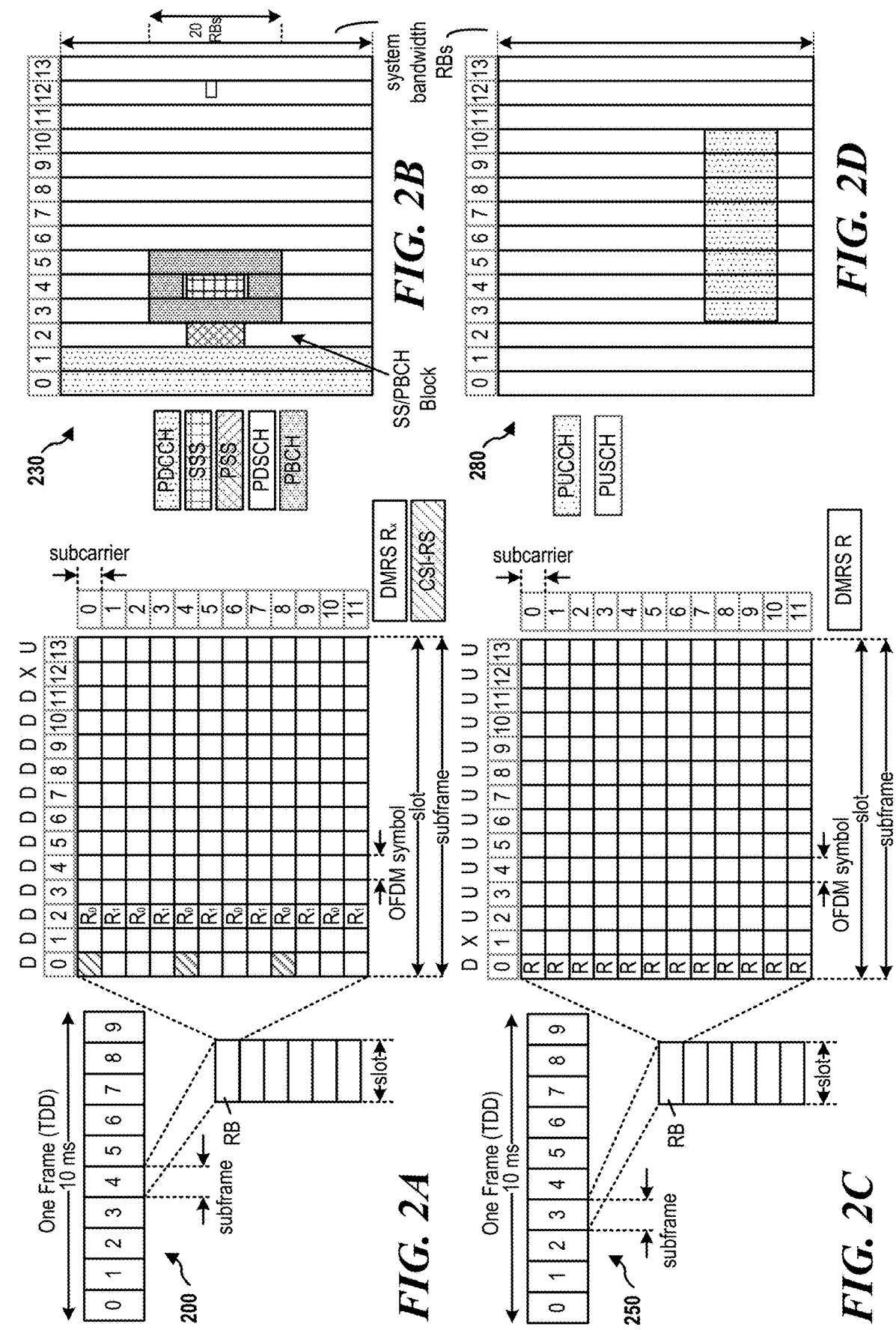
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more FDM channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
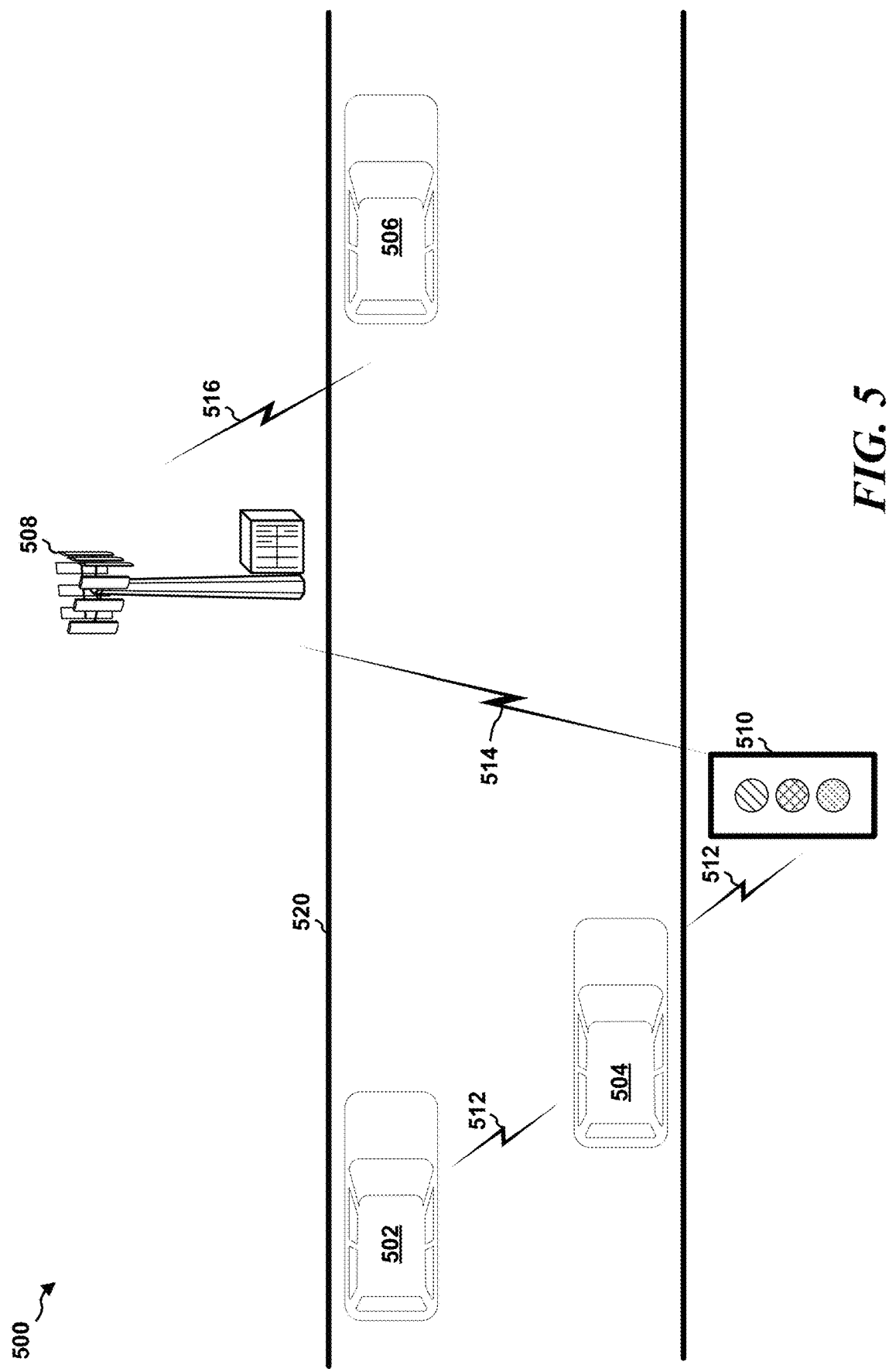
FIG. 5 is a block diagram illustrating an example of a vehicle-to-everything (V2X) system with a road side unit (RSU), according to aspects of the present disclosure.

FIG. 5 is a block diagram illustrating an example of a V2X system 500 with an RSU, 510 according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
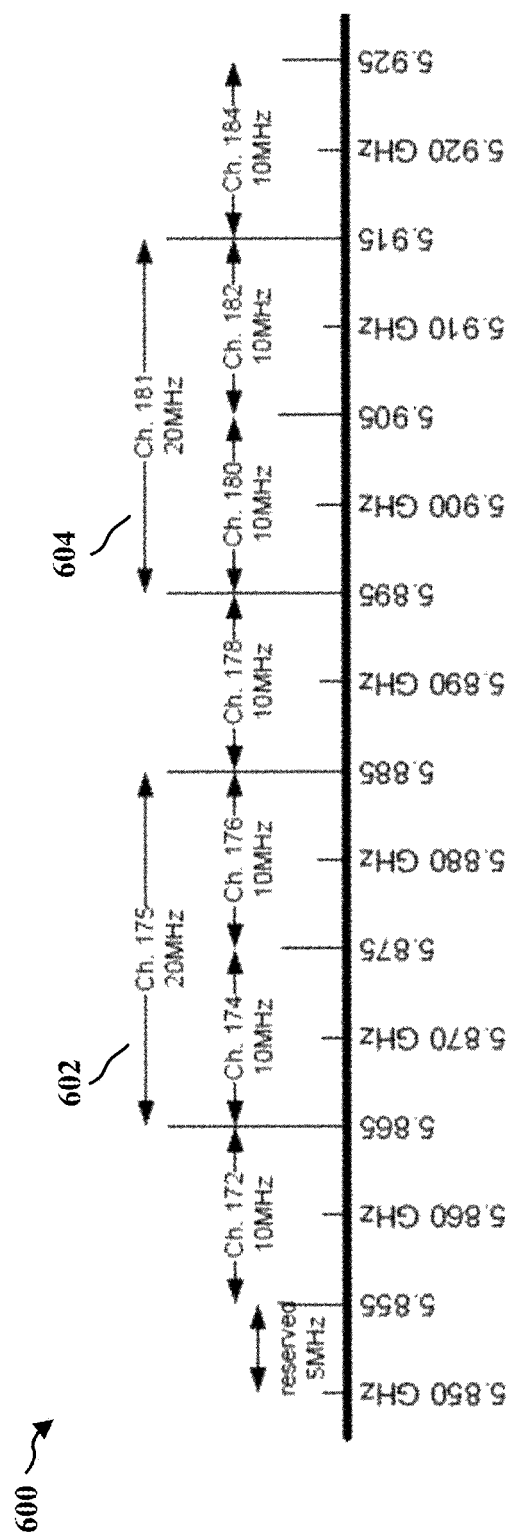
FIG. 6 is a diagram illustrating an example of a radio frequency spectrum with dedicated portions of radio frequency for V2X communications, in accordance with various aspects of the present disclosure.

FIG. 6 is a diagram illustrating an example of a radio frequency spectrum 600 with dedicated portions of radio frequency for V2X communications, in accordance with aspects of the present disclosure. In this example, the spectrum 600 shows a radio frequency range from 5.850 GHz to 5.925 GHz. The spectrum 600 is not limited to 5.850 GHz to 5.925 GHz.

From the radio frequency spectrum 600, one or more sections may be allocated for V2X communications. As an example, a 20 MHz section 602 (e.g., channel 175) from 5.865 GHz to 5.885 GHz, and another 20 MHz section 604 (e.g., channel 181) from 5.895 GHz to 5.915 GHz may be allocated for V2X communications. Each of the two allocated radio frequency sections 602 and 604 may be divided into multiple subchannels. One or more subchannels may be allocated to UEs for V2X communications. In one example, the allocated radio frequency sections 602 and 604 may be divided into four individual subchannels of 5 MHz each, for the V2X communications.

Specific radio frequency sections that are allocated to V2X communications may be jurisdiction specific. For example, the radio frequency sections 602 and 604 are dedicated frequency resources for V2X communications in the United States. Different radio frequency resources may be dedicated to V2X communications in different jurisdictions.

As described above, to enable communication between devices (e.g., UEs), radio frequency resources are assigned. In some scenarios, autonomous resource selection by a sidelink UE occurs, such as with respect to NR mode 2. Autonomous resource selection by the sidelink UE is based on sensing information obtained during a sensing window. Sensing prior communications enables the UE to predict what resources neighbor sidelink UEs might use, allowing the UE to schedule its own transmissions around resources predicted to be occupied. For example, the UE can detect reservations for future slots and exclude those slots from a resource selection window.

In some configurations, the sensing information is obtained by decoding sidelink control information and measuring energy on resources during the sensing window. Based on what was observed, the sensing information enables the UE to predict subchannel availability/occupancy in a future resource selection window. A minimum size of the resource window is limited by pre-configuration. A maximum length is limited by a packet delay budget. The size itself is up to UE implementation within those bounds. As discussed, different UEs may be allocated different subchannels. Additionally, a UE may schedule a transmission on one or more subchannels from a future resource selection window. As such, a UE may be aware of a per subchannel availability for the future resource selection window. Thus, the sensing information may provide resource availability and unavailability on a per subchannel basis for the future resource selection window. The future resource selection window may be configured via signaling (e.g., system information block/radio resource control (SIB/RRC signaling)) from a base station or pre-configured for out-of-coverage operation.

Figure 7:
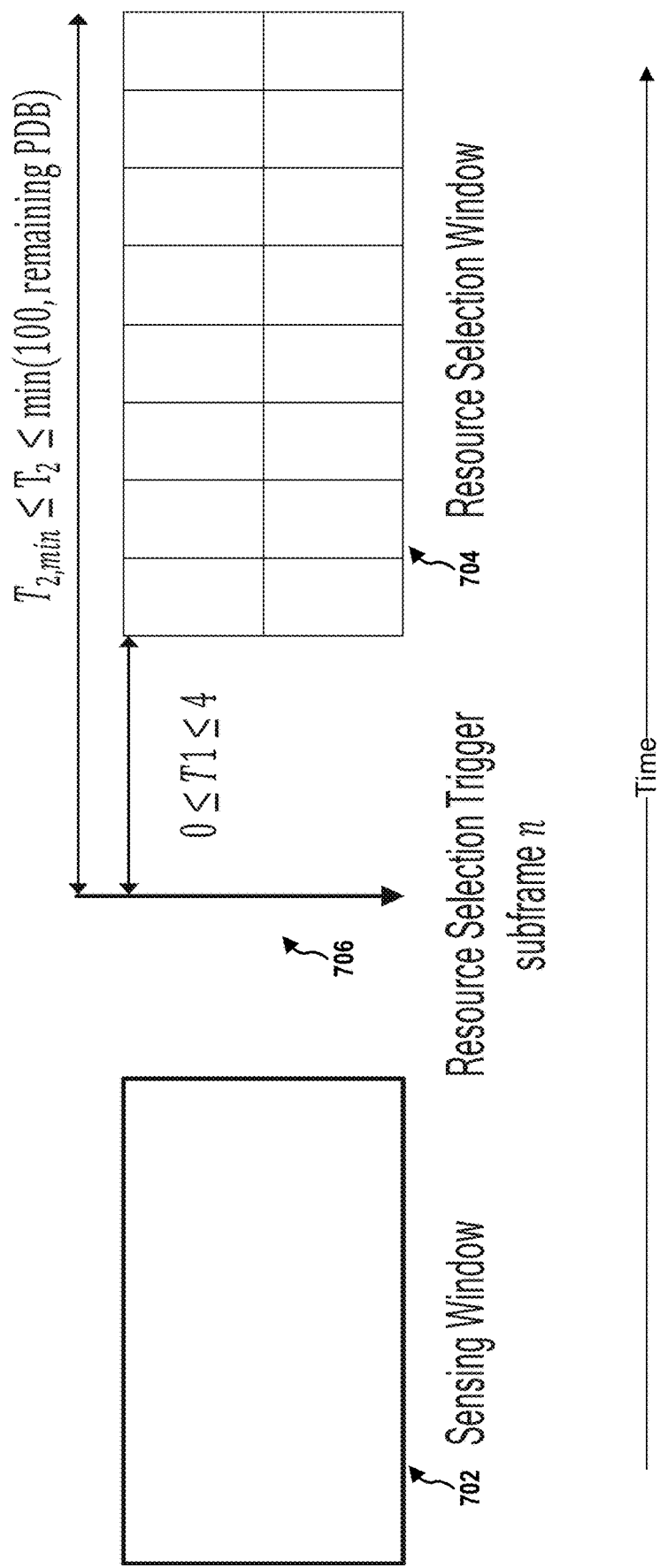
FIG. 7 is a block diagram showing a sensing window and a resource selection window for a long term evolution (LTE) system.

FIG. 7 is a block diagram showing a sensing window and a resource selection window for a long term evolution (LTE) system. LTE has three sensing modes. One sensing mode is full sensing, in which all slots in the sensing window are sensed. An exemplary sensing window 702 is seen in FIG. 7. A second sensing mode is partial sensing, in which a subset of slots in the sensing window are sensed. A third sensing mode involves no sensing, in which the UE randomly selects slots for transmission. A configuration selects between the three modes. It is noted that LTE supports periodic reservations and a maximum number of retransmissions (e.g., a first and second retransmission) for each transport block (TB).

Figure 10:
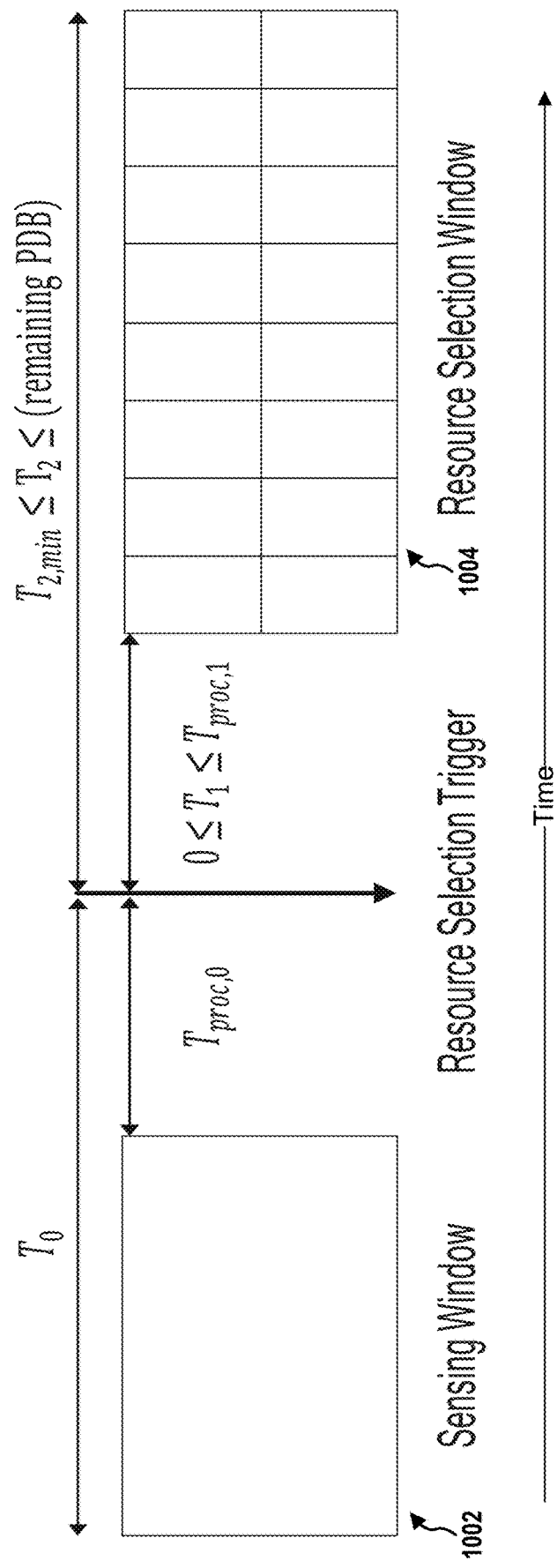
FIG. 10 is a block diagram showing a sensing window and a resource selection window for a new radio (NR) system.

Resource selection from a resource selection window 704 can be based on a trigger 706. The trigger 706 can be a packet for transmission arriving on the physical layer of the sidelink UE. As seen in FIG. 7, the trigger 706 in subframe n, defines the resource selection window 704. The resource selection window 704 occurs between two times $[n+T_1, n+T_2]$. The starting time $T_1$ may be less than or equal to four subframes (e.g., $T_1 \leq 4$ subframes) and is based on user equipment (UE) implementation. In new radio (NR), $T_1 \leq T_{proc,1}$, where $T_{proc,1}$ corresponds to a UE processing latency (as seen in FIG. 10). The ending time $T_2$ occurs no earlier than time $T_{2,min}$, which is configured in accordance with a priority. The ending time $T_2$ is upper bounded by a minimum of 100 subframes and a remaining time in a packet delay budget (PDB) for LTE systems. For NR systems, $T_2$ is upper bounded only by the packet delay budget (as seen in FIG. 10).

For full sensing in LTE systems, all resources in the resource selection window 704 are initially considered candidates. The UE monitors all subframes in the sensing window 702 $[t_{n'-10 \times P_{step}}^{SL}, t_{n'-1}^{SL}]$, where $t_{n'}^{SL}=n$, if subframe n belongs to the set $\{t_0^{SL}, t_1^{SL}, \ldots, t_{T_{max}}^{SL}\}$, otherwise $t_{n'}^{SL}$ is the first subframe in the set. If a UE does not sense in a subframe, it excludes resources according to the following where $P_{step}$ is defined as shown in FIG. 8. FIG. 8 is a table showing a parameter for resource selection for a resource selection window.

if there is an integer j satisfying $y+j \times P'_{rsvp\_TX}=z+P_{step} \times k \times q$ j=0, 1, . . . , $C_{resel}$−1

$C_{resel}$=10×SL_RESOURECE_RESELECTION_CENTER $P'_{resp\_TX}=P_{step} \times P_{rsvp\_TX}/100$ k any value allowed by restrictResourceReservationPeriod q=1, 2, . . . , Q, where:

Q=1/k if k<1 and $n'-z \leq P_{step} \times k$

Q=1 otherwise

The final candidate set of resources for the resource selection window 704 is reported to higher layers.

Partial sensing in LTE initially considers a subset Y of subframes of the resource selection window 704 as candidates. The subset Y≥minNumCandidateSF and is based on UE implementation. The parameter minNumCandidateSF is configured to {1, . . . , 13}. With partial sensing, the UE monitors a subset of subframes in the sensing window 702. For every subframe $t_y^{SL}$ in the subset Y, the UE monitors subframes $t_{y-k \times P_{step}}$ if the $k^{th}$ bit in the 10-bit gapCandidate-Sensing parameter is set to 1. There is no additional exclusion for unmonitored subframes. The final candidate set of resources is reported to higher layers.

No sensing and/or random selection is another sensing procedure for resource selection in LTE. With the no sensing procedure, the UE considers all resources in the resource selection window 704 as candidates. No sensing is performed. The UE randomly selects resources from the resource selection window 704 and reports the final candidate set to higher layers.

FIG. 9 is a table showing a summary of three LTE sensing procedures, including full sensing, partial sensing, and no sensing. Although the LTE procedures can be applied to NR communications for periodic traffic, there is a desire for updated procedures to support aperiodic traffic in NR systems. There is also a desire to enable limited sensing in NR sidelink communications while reducing an impact on full sensing UEs for both periodic and aperiodic traffic. Such limited sensing will reduce UE power consumption and/or UE implementation complexity.

FIG. 10 is a block diagram showing a sensing window 1002 and a resource selection window 1004 for NR systems. A sensing window size $T_0-T_{proc,0}$ is configured to 100 ms or 1100 ms. A sensing window size of 100 ms covers most cases of thirty-two logical slots for aperiodic reservations. A size of 1000+100 ms adds the largest possible period value. Aperiodic reservations are always present in NR systems. Periodic reservation may be enabled and/or disabled by configuration.

According to aspects of the present disclosure, a limited sensing window size is introduced. The limited sensing is reduced relative to current standards based sensing (e.g., Third Generation Partnership Project (3GPP) release 16 sensing). In some aspects, a smaller sensing window size, T0-Tproc,0, is 50 ms, in one example. In other aspects, a maximum distance between slot reservations, W', is limited to less than thirty-two logical slots. With the smaller sensing window size, $T_0$, transmissions may be limited to a subset of slots or resources in the transmission resource pool.

Figures 11A, 11B:
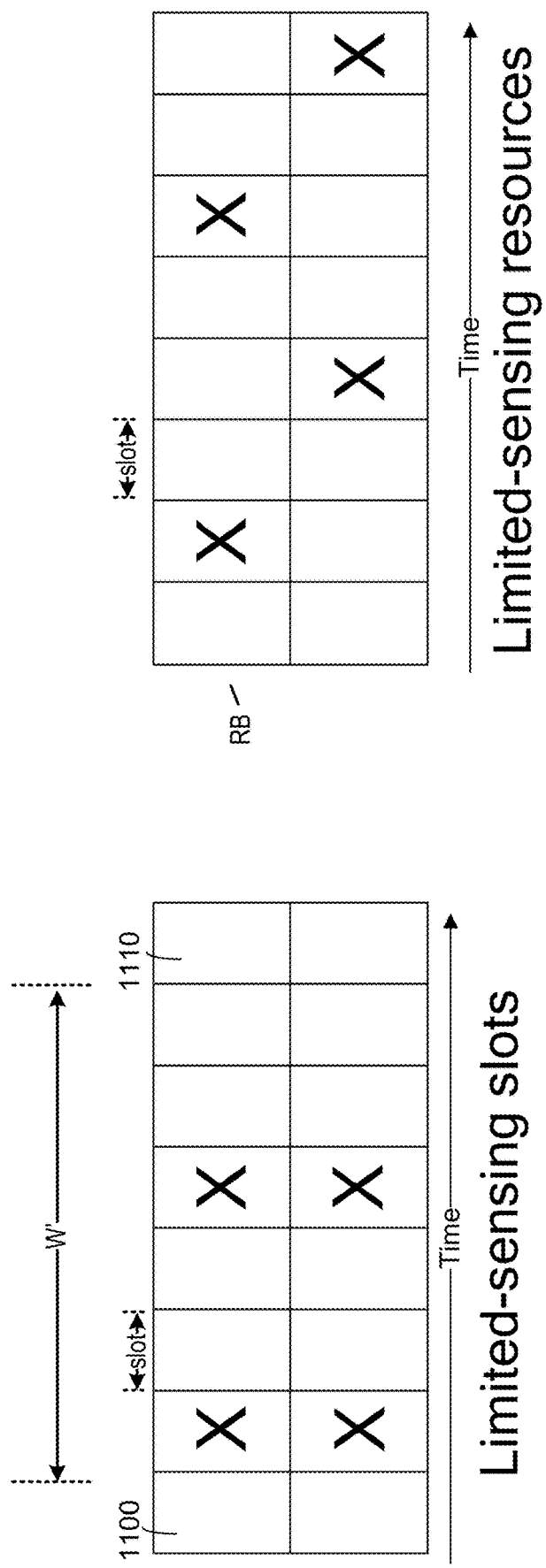
FIG. 11A and FIG. 11B show configurations for limiting slots or resources, according to aspects of the present disclosure.

FIG. 11A and FIG. 11B show configurations for limiting slots or resources, according to aspects of the present disclosure. FIG. 11A shows a sensing window with certain slots (designated by an X) excluded for sensing. Thus, the UE only senses during the slots without an X. FIG. 11B shows a sensing window having selected resources (RBs) designated by an X) excluded for sensing. Thus, the UE only senses during the resources without an X.

A UE is permitted to reserve resources for three slots, a current slot and up to two future reservations. The maximum distance between slot reservations, W', on the subset of slots may be limited to be less than thirty-two logical slots. That is, UEs can only reserve slots W' slots in advance. As seen in FIG. 11A, a first slot 1100 can be reserved. A second slot 1110 may be reserved W' slots after the first slot 1100. In the example of FIG. 11A, the second slot 1110 is reserved seven slots later, such that W' equals seven slots, for example. In other aspects, legacy UEs may increase a maximum distance between reservations, for example, W' may be equal to thirty-two slots. For legacy UEs, the excluded resources may be marked as reserved within the legacy transmission resource pool. For example, as seen in FIGS. 11A and 11B, the reserved resources are marked with Xs.

According to other aspects of the present disclosure, the reduced sensing is implemented with a reduced sensing duty cycle. The reduced sensing window may be applied with or without the reduced maximum distance between reservations, W'.

Figure 12:
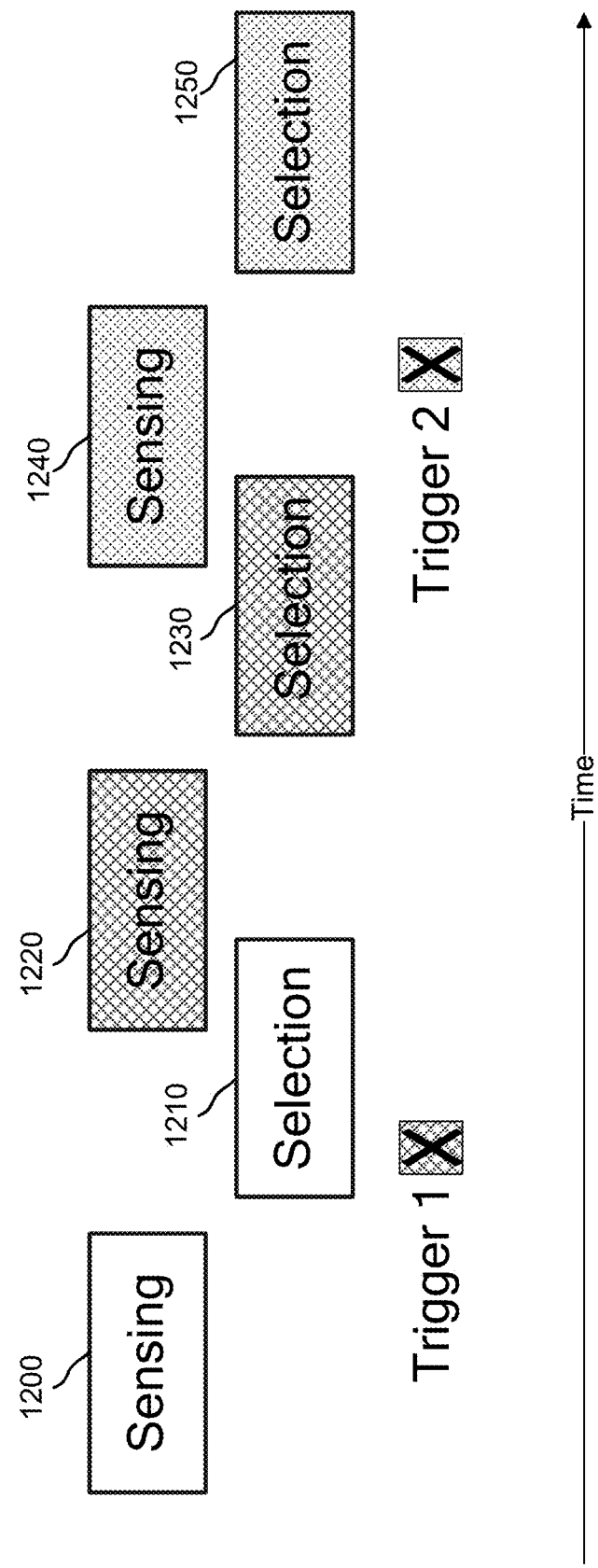
FIG. 12 is a block diagram showing a reduced sensing duty cycle, in accordance with aspects of the present disclosure.

FIG. 12 is a block diagram showing a reduced sensing duty cycle, in accordance with aspects of the present disclosure. The reduced sensing period permits discontinuous sensing, as opposed to a conventional continuous sensing window. There are periods where the UE performs full sensing, such as during sensing windows 1200, 1220, and 1240, and there are also periods where no sensing occurs, such as between a first sensing window 1200 and a second sensing window 1220. In this aspect of the present disclosure, the UE defines a resource selection window and then the UE places a corresponding sensing window. For example, as seen in FIG. 12, the UE defines a first resource selection window 1210, and senses during the first sensing window 1200 that is based on a timing of the first resource selection window 1210.

In FIG. 12, a first trigger (trigger 1) occurs during the first resource selection window 1210. Because sensing occurred during the first sensing window 1200 paired with the first resource selection window 1210, the UE can transmit the packet during the first resource selection window 1210. If, however, the trigger occurs late in the first resource selection window 1210, the UE may wait to transmit the packet in a second resource selection window 1230 after sensing occurs in the second sensing window 1220. The UE decides whether to wait based on a combination of how much time remains in the first resource selection window 1210 and a packet delay budget. If a second trigger (trigger 2) occurs during a sensing window (e.g., a third sensing window 1240), the transmission cannot occur immediately because there is no resource selection window coinciding with the second trigger (trigger 2). Rather, the UE waits until a third resource selection window 1250 for transmission.

In other aspects, the UE may stop sensing if no selection trigger is received. For example, if the UE stopped sensing during the first sensing window 1200, the first resource selection window 1210 would not be available. In this case, the first trigger (trigger 1) would not transmit during the first resource selection window 1210, but would instead wait for sensing triggered in the second sensing window 1220 and the subsequent second resource selection window 1230.

According to further aspects of the present disclosure, on-demand sensing is only performed after a trigger is received. On-demand sensing may be applied with or without the reduced maximum distance between slot reservations, W'.

Figure 13:
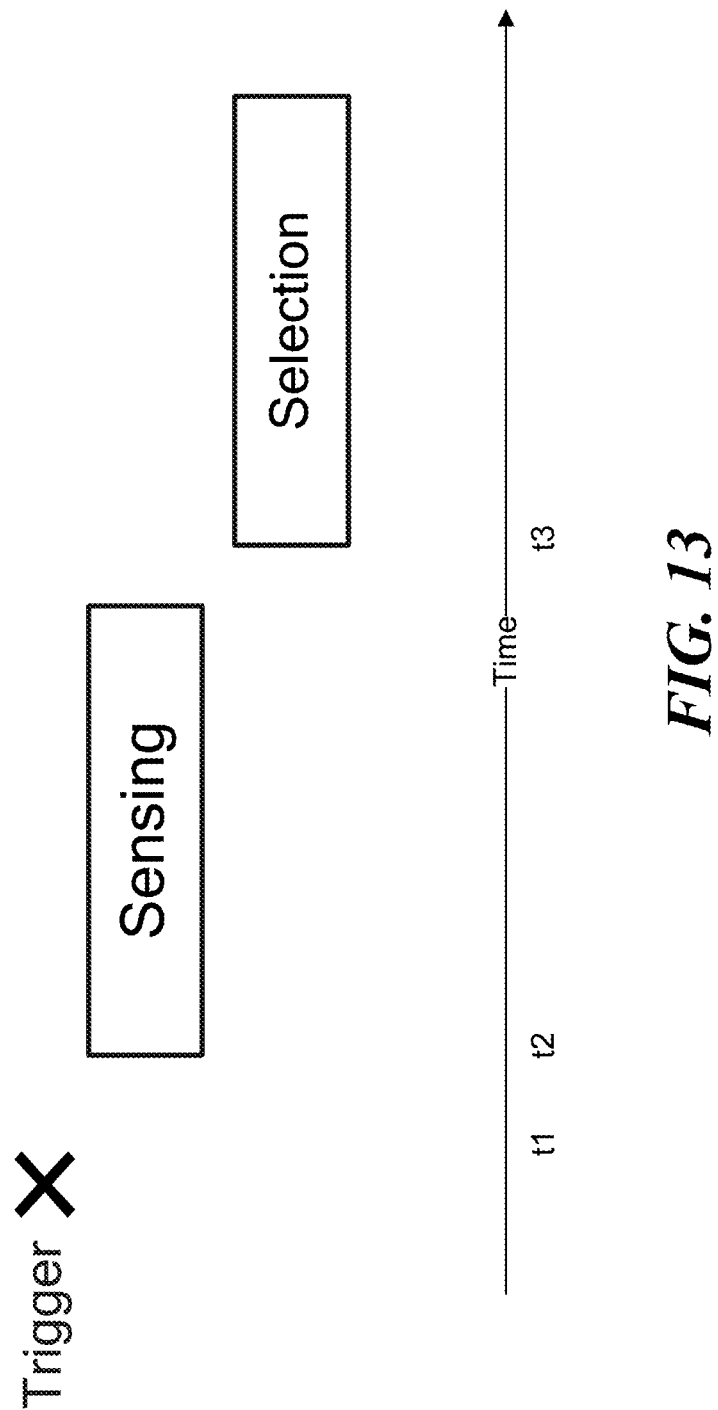
FIG. 13 is a block diagram showing on-demand sensing, in accordance with aspects of the present disclosure.

FIG. 13 is a block diagram showing on-demand sensing, in accordance with aspects of the present disclosure. After a trigger occurs at time t1, sensing begins at time t2. The sensing may occur for a reduced period of time or a standard amount of time. A corresponding resource selection window is available at time t3, after the sensing window. In these aspects, the UE is not ready to transmit upon receiving the trigger, but instead senses and transmits later.

The sensing can be extended for retransmissions. That is, sensing will continue without an additional trigger until a time for and/or a number of retransmissions expires.

Periodic reservations may specify larger sensing windows. According to other aspects of the present disclosure, partial sensing (as described with respect to FIG. 9) is implemented for periodic traffic, whereas reduced sensing (as described with respect to FIGS. 11A-13) is applied for aperiodic traffic. In still other aspects, reduced sensing is applied for both periodic and aperiodic traffic.

As indicated above, FIGS. 7-13 are provided as examples. Other examples may differ from what is described with respect to FIGS. 7-13.

Figure 14:
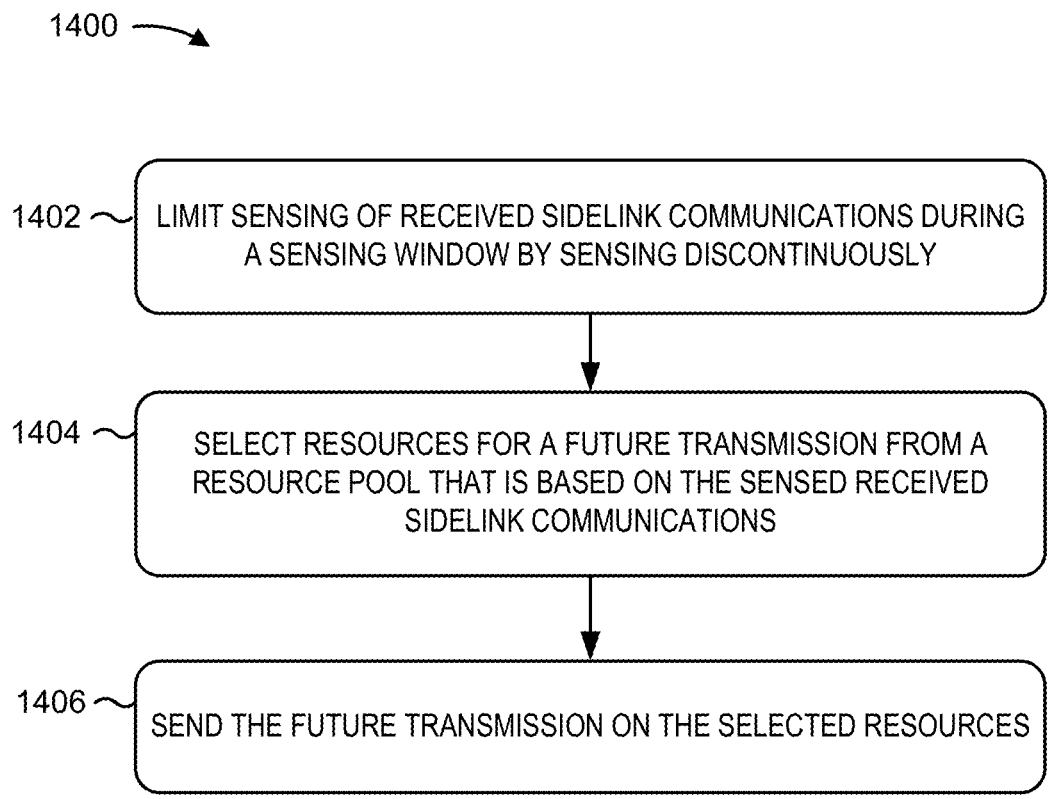
FIG. 14 is a flow diagram illustrating an example process performed, for example, by a sidelink user equipment, in accordance with various aspects of the present disclosure.

FIG. 14 is a flow diagram illustrating an example process 1400 performed, for example, by a sidelink user equipment, in accordance with the various aspects of the present disclosure. The example process 1400 is an example of a reduced sensing procedure for sidelink communications.

In some aspects, the process 1400 may include limiting sensing of received sidelink communications during a sensing window by sensing discontinuously (block 1402). For example, the user equipment (e.g., using the antenna 352, RX/TX 354, RX processor 356, controller/processor 359, and/or memory 360) senses received sidelink communications. The limited sensing may include reducing a size of the sensing window to less than 100 ms. In some aspects, the UE may select a resource selection window to include an interval corresponding to a sensing duty cycle. Sensing may stop in case a selection trigger is not received. The limited sensing may occur with both periodic and aperiodic traffic.

The process 1400 may also include selecting resources for a future transmission from a resource pool that is based on the sensed received sidelink communications (block 1404). For example, the user equipment (e.g., using the controller/processor 359 and/or memory 360) selects resources for a future transmission from a resource pool. In some aspects, the UE selects resources from a subset of resource in the resource pool. The subset may be a subset of slots.

The process 1400 may further include sending the future transmission on the selected resources (block 1406). For example, the user equipment (e.g., using the antenna 352, RX/TX 354, TX processor 368, controller/processor 359, and/or memory 360) sends the future transmission.

Figure 15:
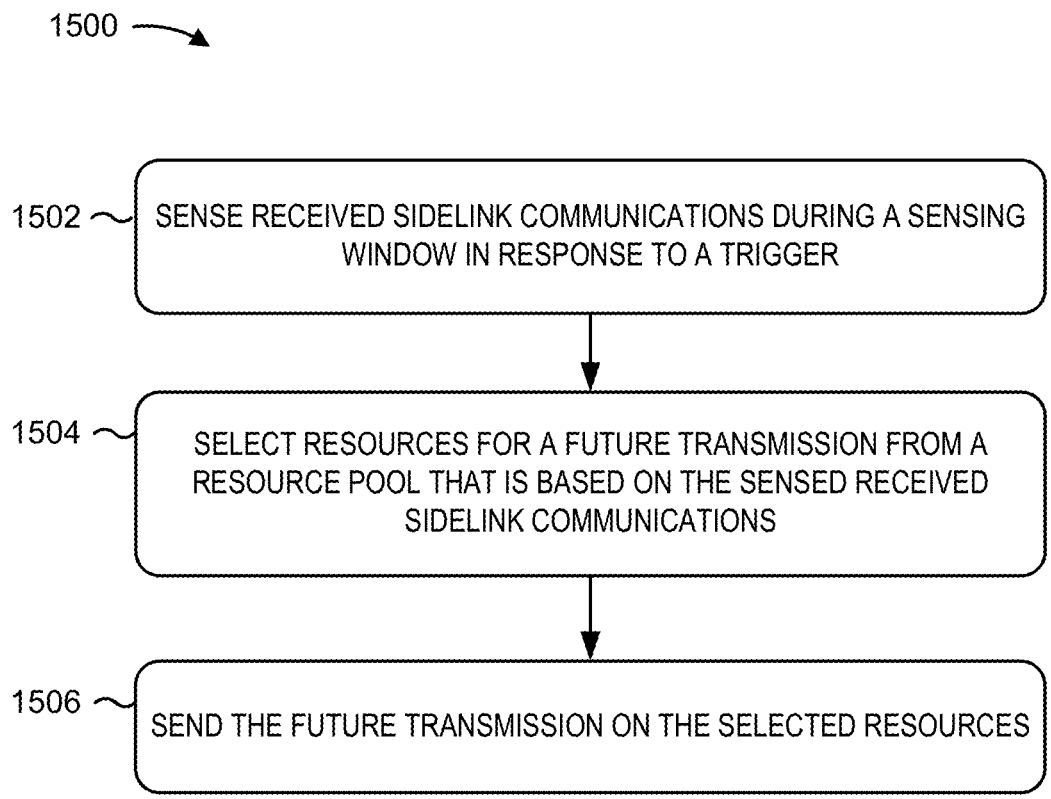
FIG. 15 is a flow diagram illustrating an example process performed, for example, by a sidelink user equipment, in accordance with various aspects of the present disclosure.

FIG. 15 is a flow diagram illustrating an example process 1500 performed, for example, by a sidelink user equipment, in accordance with the various aspects of the present disclosure. The example process 1500 is an example of a reduced sensing procedure for sidelink communications.

In some aspects, the process 1500 may include sensing received sidelink communications during a sensing window in response to a trigger (block 1502). For example, the user equipment (e.g., using the antenna 352, RX/TX 354, RX processor 356, controller/processor 359, and/or memory 360) senses received sidelink communications. The limited sensing may include reducing a size of the sensing window to less than 100 ms. In some aspects, the UE may select a resource selection window to include an interval corresponding to a sensing duty cycle. The limited sensing may occur with both periodic and aperiodic traffic.

The process 1500 may also include selecting resources for a future transmission from a resource pool that is based on the sensed received sidelink communications (block 1504). For example, the user equipment (e.g., using the controller/processor 359 and/or memory 360) selects resources for a future transmission from a resource pool. In some aspects, the UE selects resources from a subset of resource in the resource pool. The subset may be a subset of slots.

The process 1500 may further include sending the future transmission on the selected resources (block 1506). For example, the user equipment (e.g., using the antenna 352, RX/TX 354, TX processor 368, controller/processor 359, and/or memory 360) sends the future transmission.

Implementation examples are described in the following numbered clauses.

1. A method of wireless communication by a sidelink user equipment (UE), comprising:
limiting sensing of received sidelink communications during a sensing window, by sensing discontinuously;
selecting resources for a future transmission from a resource pool that is based on the sensed received sidelink communications; and
sending the future transmission on the selected resources.

2. The method of clause 1, in which the limiting sensing comprises reducing a size of the sensing window to less than 100 ms.

3. The method of clause 1 or 2, in which the selecting resources comprises selecting from a subset of resources in the resource pool.
4. The method of any of the preceding clauses, in which the subset of resources comprises a subset of slots.
5. The method of any of the preceding clauses, further comprising reserving resources with a maximum distance between reservations that is less than 32 logical slots.
6. The method of any of the preceding clauses, further comprising limiting sensing for periodic traffic and for aperiodic traffic.
7. The method of any of the preceding clauses, further comprising selecting a resource selection window to include an interval corresponding to a sensing duty cycle.
8. The method of any of the preceding clauses, further comprising stopping sensing when a selection trigger is not received.
9. The method of any of the preceding clauses, further comprising reserving future resources with a maximum distance between reservations that is less than 32 logical slots.
10. A method of wireless communication by a sidelink user equipment (UE), comprising:
    sensing received sidelink communications during a sensing window, in response to a trigger;
    selecting resources for a future transmission from a resource pool that is based on the sensed received sidelink communications; and
    sending the future transmission on the selected resources.
11. The method of clause 10, further comprising limiting sensing by reducing a size of the sensing window to less than 100 ms.
12. The method of clause 10 or 11, in which the selecting resources comprises selecting from a subset of resources in the resource pool.
13. The method of any of the clauses 10-12, in which the subset of resources comprises a subset of slots.
14. The method of any of the clauses 10-13, further comprising reserving resources with a maximum distance between reservations that is less than 32 logical slots.
15. The method of any of the clauses 10-14, further comprising reserving future resources with a maximum distance between reservations that is less than 32 logical slots.
16. The method of any of the clauses 10-15, further comprising sensing without another trigger when the future transmission comprises a pending retransmission.
17. The method of any of the clauses 10-16, further comprising limiting sensing for periodic traffic and for aperiodic traffic.
18. An apparatus for wireless communications at a user equipment (UE), comprising:
    a processor,
    memory coupled with the processor; and
    instructions stored in the memory and operable, when executed by the processor, to cause the apparatus:
    to limit sensing of received sidelink communications during a sensing window by sensing discontinuously;
    to select resources for a future transmission from a resource pool that is based on the sensed received sidelink communications; and
    to send the future transmission on the selected resources.
19. The apparatus of clause 18, in which the processor causes the apparatus to limit sensing by reducing a size of the sensing window to less than 100 ms.
20. The apparatus of clause 18 or 19, in which the processor causes the apparatus to select resources by selecting from a subset of resources in the resource pool.
21. The apparatus of any of the clauses 18-20, in which the subset of resources comprises a subset of slots.
22. The apparatus of any of the clauses 18-21, in which the processor causes the apparatus to reserve resources with a maximum distance between reservations that is less than 32 logical slots.
23. The apparatus of any of the clauses 18-22, in which the processor causes the apparatus to limit sensing for periodic traffic and for aperiodic traffic.
24. The apparatus of any of the clauses 18-23, in which the processor causes the apparatus to select a resource selection window to include an interval corresponding to a sensing duty cycle.
25. The apparatus of any of the clauses 18-24, in which the processor causes the apparatus to stop sensing when a selection trigger is not received.
26. An apparatus for wireless communications at a user equipment (UE), comprising:
    a processor,
    memory coupled with the processor; and instructions stored in the memory and operable, when executed by the processor, to cause the apparatus:
    to sense received sidelink communications during a sensing window, in response to a trigger;
    to select resources for a future transmission from a resource pool that is based on the sensed received sidelink communications; and
    to send the future transmission on the selected resources.
27. The apparatus of clause 26, in which the processor causes the apparatus to limit sensing by reducing a size of the sensing window to less than 100 ms.
28. The apparatus of clause 26 or 27, in which the processor causes the apparatus to reserve resources with a maximum distance between reservations that is less than 32 logical slots.
29. The apparatus of any of the clauses 26-28, in which the processor causes the apparatus to sense without the trigger when the future transmission comprises a pending retransmission.
30. The apparatus of any of the clauses 26-29, in which the processor causes the apparatus to limit sensing for periodic traffic and for aperiodic traffic.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a sidelink user equipment (UE), comprising:
    limiting sensing of received sidelink communications to a sensing window having a size of less than 100 milliseconds (ms);
    selecting resource selection windows having an interval corresponding to a sensing duty cycle;
    selecting resources for a future transmission from the resource selection windows, the resources selected based on the sensed received sidelink communications; and
    sending the future transmission on the selected resources.

2. The method of claim 1, in which the selecting resources comprises selecting from a subset of resources in the resource selection windows.

3. The method of claim 2, in which the subset of resources comprises a subset of slots.

4. The method of claim 1, further comprising reserving resources with a maximum distance between reservations that is less than 32 logical slots.

5. The method of claim 1, further comprising limiting sensing for periodic traffic and for aperiodic traffic.

6. The method of claim 1, further comprising stopping sensing when a selection trigger is not received.

7. The method of claim 1, further comprising reserving future resources with a maximum distance between reservations that is less than 32 logical slots.

8. A method of wireless communication by a sidelink user equipment (UE), comprising:
    receiving a trigger;
    sensing received sidelink communications during a sensing window, in response to the trigger;
    selecting resources for a future transmission from a resource pool that is based on the sensed received sidelink communications; and
    sending the future transmission on the selected resources.

9. The method of claim 8, further comprising limiting sensing by reducing a size of the sensing window to less than 100 milliseconds (ms).

10. The method of claim 8, in which the selecting resources comprises selecting from a subset of resources in the resource pool.

11. The method of claim 10, in which the subset of resources comprises a subset of slots.

12. The method of claim 8, further comprising reserving resources with a maximum distance between reservations that is less than 32 logical slots.

13. The method of claim 8, further comprising reserving future resources with a maximum distance between reservations that is less than 32 logical slots.

14. The method of claim 8, further comprising sensing without another trigger when the future transmission comprises a pending retransmission.

15. The method of claim 8, further comprising limiting sensing for periodic traffic and for aperiodic traffic.

16. An apparatus for wireless communications at a user equipment (UE), comprising:
    a processor,
    memory coupled with the processor; and
    instructions stored in the memory and operable, when executed by the processor, to cause the apparatus:
        to limit sensing of received sidelink communications to a sensing window having a size of less than 100 milliseconds (ms);
        to select resource selection windows having an interval corresponding to a sensing duty cycle;
        to select resources for a future transmission from the resource selection windows, the resources selected based on the sensed received sidelink communications; and
        to send the future transmission on the selected resources.

17. The apparatus of claim 16, in which the processor causes the apparatus to select resources by selecting from a subset of resources in the resource selection windows.

18. The apparatus of claim 17, in which the subset of resources comprises a subset of slots.

19. The apparatus of claim 16, in which the processor causes the apparatus to reserve resources with a maximum distance between reservations that is less than 32 logical slots.

20. The apparatus of claim 16, in which the processor causes the apparatus to limit sensing for periodic traffic and for aperiodic traffic.

21. The apparatus of claim 16, in which the processor causes the apparatus to stop sensing when a selection trigger is not received.

22. An apparatus for wireless communications at a user equipment (UE), comprising:
    a processor,
    memory coupled with the processor; and
    instructions stored in the memory and operable, when executed by the processor, to cause the apparatus:
        to receive a trigger;
        to sense received sidelink communications during a sensing window, in response to the trigger;

to select resources for a future transmission from a resource pool that is based on the sensed received sidelink communications; and to send the future transmission on the selected resources.

23. The apparatus of claim 22, in which the processor causes the apparatus to limit sensing by reducing a size of the sensing window to less than 100 milliseconds (ms).

24. The apparatus of claim 22, in which the processor causes the apparatus to reserve resources with a maximum distance between reservations that is less than 32 logical slots.

25. The apparatus of claim 22, in which the processor causes the apparatus to sense without the trigger when the future transmission comprises a pending retransmission.

26. The apparatus of claim 22, in which the processor causes the apparatus to limit sensing for periodic traffic and for aperiodic traffic.

* * * * *